United States Patent [19]

Fernandez et al.

[11] 3,761,714
[45] Sept. 25, 1973

[54] STABILIZED OPTICAL TRACKING DEVICE

[75] Inventors: Peter Fernandez, Lackawanna; Seymour Rosin, Massapequa Park, L.I., both of N.Y.; Wright H. Scidmore, Langhorne, Pa.; Gordon H. Sigman, Jr., Delran, N.J.

[73] Assignee: The United States of America as represented by the Secretary of the Army, Washington, D.C.

[22] Filed: May 16, 1972

[21] Appl. No.: 253,743

[52] U.S. Cl.............250/348, 250/203 CT, 356/51
[51] Int. Cl.................................................. G01t 1/16
[58] Field of Search .................. 356/2, 51; 244/76; 250/83.3 HP, 203 CT

[56] References Cited
UNITED STATES PATENTS

| | | | |
|---|---|---|---|
| 3,057,953 | 10/1962 | Guerth | 250/203 CT |
| 3,423,051 | 1/1969 | Jakab | 250/83.3 HP |
| 3,641,261 | 2/1972 | Chaplin et al. | 250/203 CT |

Primary Examiner—Harold A. Dixon
Attorney—Harry M. Saragovitz et al.

[57] ABSTRACT

A stabilized optical tracking device is disclosed as capable of assisting an airborne observer in tracking a ground target through highly accurate optical sighting means. A unique feature of the inventive device is the integration into a single optical system of a variety of modular subsystems whereby extreme flexibility in usage is provided.

The invention described herein may be manufactured, used and licensed by or for the Government for governmental purposes without the payment to us of any royalty thereon.

14 Claims, 1 Drawing Figure

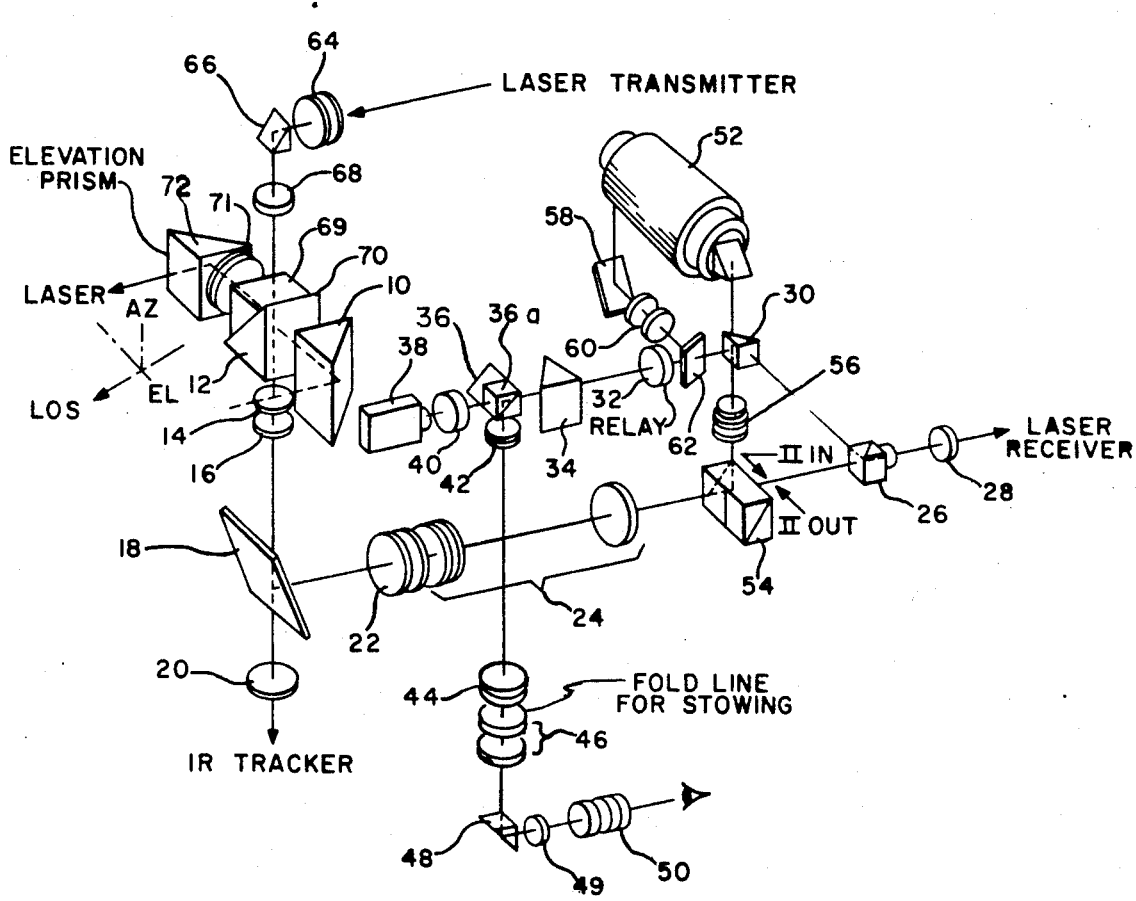

STABILIZED OPTICAL TRACKING DEVICE

BACKGROUND OF THE INVENTION

1. Field of the Invention

This invention relates to an optical tracking device and particularly, to a stabilized optical tracking device for assisting an airborne observer in tracking a ground target through highly accurate optical sighting means. More particularly, the invention relates to a stabilized optical tracking device which integrates into a single optical system a variety of modular subsystems thereby providing extreme flexibility in usage.

2. Description of the Prior Art

The design and construction of a wide variety of pointing and tracking systems for use by the military in fire control and missile applications repletes the art. Such systems often embody optical means and may be telescopic, photographic or photoelectrical in character and may involve the use of light amplification by the stimulated emission of radiation, i.e., lasers, or spectroscopy, e.g., infrared tracking. Notwithstanding the existance of such systems the need has remained extant for a flexible optical tracking system which exhibits desirable versatility and flexibility in normal fire control and missile application usage. In general, prior art optical tracking systems have necessitated time-consuming redesign of the optics of the system telescope to effect adaptation to different installations. A more important disadvantage, however, resides in the inability of the prior art systems to combine high optical performance with high tracking and stabilization performance. Diminished optical performance is evidenced by a reduced level of resolution over the full field or parts thereof. Deficiencies in tracking and stabilization performance may include target blurring due to aircraft vibration and maneuver or inability to achieve high accuracy over extended operating periods with reduced operator fatigue.

SUMMARY OF THE INVENTION a. The present invention is directed to a stabilized optical tracking device for permitting an airborne observer to view and track a ground target, said device comprising the following plurality of elements constructed and arranged to provide an optical path therethrough:

a scanning head comprising a 90° bend visual elevation prism and a 90° bend visual azimuth prism, said elevation prism being adapted to receive target light and to rotate about a horizontal axis perpendicular to the line of sight and said azimuth prism being adapted to transmit the optical path from said elevation prism and to rotate about a vertical axis perpendicular to the line of sight when pointing directly ahead, means for folding the optical path from the azimuth prism of said scanning head through an objective to a reticle block, said objective being adjustable to bring the light rays in the optical path to a focus at said reticle block, a first 90° bend prism followed by a first relay lens for returning the optical path from said reticle block in a direction parallel to its folded path through a derotator prism, said derotator prism being servo driven and arranged and constructed to maintain an erect image as the scanning head rotates, a second 90° bend prism for directing the optical path from said derotator prism downward through a pair of windows, and a third 90° bend prism for directing the optical path from said windows through an eyepiece for visual viewing.

b. The invention is also directed to stabilized optical tracking device according to (a) including a negative objective lens removably insertable in the optical path between the azimuth prism and the folding means and a positive objective lens removably insertable in the optical path between the folding means and the objective to provide a reverse galilean telescope, said device being adapted for search and acquisition when both of said negative and positive objective lenses are inserted in said optical path.

c. The invention if further directed to a stabilized optical tracking device according to (b) including a second relay lens removably insertable in the optical path between said pair of windows and said second 90° bend prism, said device being adapted for target tracking when both of said negative and positive objective lenses are removed from said optical path.

d. The invention also contemplates a stabilized optical tracking device according to (c) including a third relay lens removably insertable in the optical path in place of said second relay lens between said pair of windows and said second 90° bend prism, said device being adapted for target tracking when both of said negative and positive objective lenses are removed from said optical path.

e. The invention is further directed to a stabilized optical tracking device according to (a) through (d) wherein said pair of windows are so constructed and arranged that that part of the device comprising the optical path passing therethrough to the eyepiece is foldable about an axis in a plane therebetween.

f. The invention is further directed to a stabilized optical tracking device according to (a) through (d) wherein said second 90° bend prism is interchangeable with a beam splitter, said beamsplitter being adapted to provide two optical paths, the one being coincident with that provided by said second 90° bend prism and the other being directed to a cine camera for damage assessment.

g. The invention is further directed to a stabilized optical tracking device according to (a) through (d) including a low light level image intensifier, means insertable into the optical path between the objective and said reticle block and adapted to direct the optical path to said intensifier and means simultaneously insertable into the optical path between said first 90° bend prism and said first relay lens and adapted to direct the intensified image into said eypeice.

h. The invention is further directed to a stabilized optical tracking device according to (a) through (d) wherein said scanning head includes a 90° Bend laser azimuth prism, a metal baffle between said laser and visual azimuth prisms and adapted to insure separation of laser and visual optical paths and a 90° bend laser elevation prism, said laser azimuth prism being adapted to receive a laser beam and to rotate about the same axis which said visual azimuth prism rotates and said laser elevation prism being adapted to transmit the laser beam from said laser azimuth prism along the line of sight to said target and to rotate about the same axis about which said visual elevation prism rotates, and wherein said reticle block includes precisely aligned visual and laser receiver reticles and a dichroic beamsplitter to provide eye protection from laser backscatter.

i. The invention is further directed to a stabilized optical tracking device according to (a) through (d) wherein said optical path folding means is interchangeable with a spectral beamsplitter, said spectral beamsplitter being adapted to provide two optical paths, the one being conincident with that provided by said optical path folding means and the other being directed to an infrared tracker.

The invention is based in part on the concept that an optical tracking system may be rendered extremely flexible in usage by the integration therein of a variety of subsystems, such as a laser rangefinger, an infrared tracker, a low light level image intensifier or television camera for night vision, or a cine camera for test evaluation.

The invention is also based in part on the concept that design refinement of an optical tracking system to permit rapid and simple attachment of subsystems and adaption to different installations is feasible without the need for time-consuming redesign of the optics.

DESCRIPTION OF THE DRAWING

The FIGURE is a schematic drawing of the inventive optical tracking system and depicts the basic visual optical path, folded to achieve a compact configuration, in conjunction with various subsystem optical paths.

DETAILED DESCRIPTION OF INVENTION

Preferred Embodiment

The stabilized optical tracking device schematically portrayed in the drawing is illustrative of a preferred embodiment of the invention.

In general, the invention is designed for rooftop installation in an aircraft in order to minimize airframe modifications. The depicted embodiment ordinarily will present no obstruction to normal copilot functions in fixed wing and helicopter craft.

The drawing, upper left-hand section, depicts a series of four coaxial prisms which comprise the scanning head of the inventive device. The head contains an azimuth gimbal (not shown) carrying the four prisms, while the two outer prisms are mounted in an elevation gimbal (not shown). Rate integrating gyroscopes (not shown) are also mounted on the elevation gimbal producing signals proportional to line of sight angular rates about two orthogonal axes. In normal operation, an airborne observer will control a rotatable dome wherein the head is mounted, the dome being servoed to follow the head in azimuth. Separate flat windows are mounted in the dome for laser transmission and visual aperture.

The optical ray trace from a target proceeds along the line of sight (LOS) through a flat window of the rotatable dome (not shown) to a 90° bend visual elevation prism 10, whence it is reflected from the angular face to a 90° bend visual azimuth prism 12. Visual elevation prism 10 is adapted to rotate about a horizontal axis perpendicular to the LOS and visual azimuth prism 12 is adapted to rotate about a vertical axis perpendicular to the LOS. The optical ray reflects from the angular face of visual azimuth prism 12 downward through a removably insertable negative lens 14, and thence through window 16 to spectral beamsplitter 18. The latter may be used to divide the optical path in such manner that the transmitted energy passes through window 20 to an infrared (IR) tracker, not shown, for missile guidance and similar functions, and reflected light passes through another removably insertable positive lens 22 (thereby providing in combination with lens 14 a reverse galilean telescope and a system magnification of either 1.8x or 2.7x depending upon the selected relay lens 44 or 42) and thence through an objective 24 which functions to focus the light at reticle block 26. Where it is not desired to integrate the IR tracker into the optical train a folding mirror may be employed in place of spectral beamsplitter 18.

Reticle block 26 is arranged and constructed with precisely aligned visual and laser receiver reticles and a dichroic beamsplitter to provide some eye protection for the operator from laser backscatter when the laser subsystem (hereinafter described) is in operation. This coupled with a complimentary filter, not shown, (which must be in position in order to fire the laser) provides complete protection against reflected laser energy. A laser receiver (not shown) being integrated in such manner that received energy is transmitted from the reticle block via window 28 to the receiver photomultiplier tube. The received energy is used at the receiver to determine range to the target centered in the reticle pattern.

The optical path from reticle block 26 proceeds to a first 90° bend prism 30, whence it is folded through a first relay lens 32, thence through derotator prism 34 to a second 90° bend prism 36. Derotator prism 34 is servo dirven and arranged and constructed to maintain an erect image as the scanning head rotates. A cine camera 38 is integrated into the system in the optical path from derotator prism 34 through window 40 by the employment of a control, not shown, which permits replacement of second 90° bend prism 36 with the beamsplitter portion 36a of prism 36.

From second 90° bend prism 36 or beamsplitter 36a, the otical path may pass through the 12 power relay lens 42 or 8 power relay lens 44. Relay lenses 42 and 44 are removably insertable into the optical path and are employed for target tracking. In operation, both of the 1.8 power objective lenses, 14 and 22, are employed with relay lens 44 in the case of search and acquisition. In the case of target tracking, relay lens 44 or relay lens 42 is used without lenses 14 and 22. The optical path then proceeds through a pair of windows 46 to a third 90° bend prism 48, which folds the light through filters 49 (optional) to an eyepiece 50. The pair of windows 46 are so constructed and arranged that that part of the embodied device comprising the optical path passing therethrough to eyepiece 50 is foldable about an axis in a plane between windows 46. This construction permits the lower telescope section to be folded away when not in use.

A low light level image intensifier or television camera 52 is integrated into the optical system and may be readily selected for night viewing. Selection is accomplished by inserting a reflecting prism 54 into the optical path between objective 24 and reticle block 26 to direct the optical path through windows 56 to image intensifier 52. The intensified light is then directed to a folding mirror 58 which folds the light ray through windows 60 to a mirror 62, which is selectively inserted into the optical path between prism 30 and relay lens 32.

A laser transmitter beam is sent out through a completely separate optical path. The beam trace proceeds from the laser transmitter (not shown) through windows 64 to prism 66 where the beam is reflected through a negative lens 68 to a 90° bend laser azimuth prism 69. A metal baffle 70 is inserted between the laser and visual scan prisms 69 and 12 to insure against any possibility of the laser beam damaging the operator's eye. Metal baffle 70 makes contact with the angular faces of prisms 69 and 12 and constitutes an optical separation therebetween. The reflected laser beam from laser azimuth prism 69 is collimated by positive lens 71 (which together with lens 68 forms a Galilean telescope) and proceeds to a 90° bend laser elevation prism 72, whence it is transmitted along the LOS to the target. Laser azimuth prism 69 is adapted to rotate about the same axis about which visual azimuth prism 12 rotates, and laser elevation prism 72 is adapted to rotate about the same axis about which visual elevation prism 10 rotates.

It should be pointed out that attachment of the modular subsystems, such as the IR tracker, laser transmitter and laser receiver, to the inventive tracking device necessitates the fabrication of mating optical windows, but the internal details of the attachments may be varied to take advantage of the latest developments or existing equipment.

OPTICAL PERFORMANCE

Table I contains optical performance characteristics of the invention in its preferred configuration. The optical performance for the stabilized optical tracking device, SOTD, was verified by a complete ray trace at three field points and three wavelengths for each magnification power. In order to maintain a high level or resolution over the full field, the coma was completely corrected and astigmatism reduced to small values. Maximum resultant field curvature at the edge of the 8X field is 1.7 diopters; this is not objectionable since the eye can easily accommodate this degree of focus variation. Residual astigmatism is −0.07 diopter at ⅚ field for 8X, −0.02 diopter at 1.8X and +0.55 diopter at 12X.

TABLE I

SOTD Optical Performance

| Scanning Freedom | Azimuth | +90 deg;−120 deg |
| --- | --- | --- |
|  | Elevation | +35 deg;−45 deg |
| Image Magnification |  | 1.8X,2.7X, 8X, 12X |
| Exit Pupil | 1.8X and 8X | 5.0 mm |
|  | 2.7X and 12X | 3.3 mm |
| Entrance Pupil | Visual:8X and 12X | 40 mm |
|  | 1.8X and 2.7X | 9 mm |
|  | Laser RCVR and Night Sight | 75 mm |
| Eye Relief |  | 26 mm |
| Filters (individually selectable) |  | 4 |
| Visual Train Resolving Pwr-Axial (arc sec) |  | 16 at 1.8X |
| (Approximately) |  | 3.5 at 8X |
|  |  | 3.5 at 12X |
| Visual Train Resolving Pwr-Edge of Field (arc sec) |  | 40 at 1.8X |
| (Approximately) |  | 6 at 8X |
|  |  | 9 at 12X |

The visual resolving power capability of the design was estimated from the lens data by determining angular size of the blur which contains 25 percent of the energy over the C-F spectrum, giving representative values for high contrast limiting resolution. This is considerably better than the ability of the human eye, so the telescope does not limit the resolving ability of the operator.

The performance of the night system, where the image intensifier is used, was evaluated by computing the modulation transfer function at the tube input face and the rim ray curves for the optical system which views the tube output face. The S-20 phosphor characteristic and spectral distribution of the night sky were used to obtain a wavelength weighting function for these calculations. The results indicate that the objective is capable of resolution in excess of 60 lines/mm over the field (8X). Axial spherical aberration for the relay lenses and eyepiece which view the tube ouptut face is corrected to within the diffraction limit, and there will be no noticeable secondary spectrum within the spectral distribution of the tube phosphor. Residual astigmatism is +0.04 diopter at ⅚ field for 8X and +0.19 diopter at 12X. In comparison with image tube resolution, these correspond to very small blur sizes (0.00036 for 8X).

TRACKING AND STABILIZATION PERFORMANCE

The SOTD utilizes an azimuth and an elevation servo loop to dynamically stabilize the gimbals on which the prisms are mounted. This prevents target blurring due to aircraft vibration and maneuver. Rate integrating gyros are used in the stabilization loops to sense the motion in an inertial reference system. In addition, there is a derotation prism servo loop to keep the image upright at all times and a rotating dome servo loop to keep the window in front of the scanning prisms. Table 2 indicates specifications for the system performance.

TABLE 2

Tracking and Stabilization Performance

| | |
| --- | --- |
| Inertial Stabilization | Rate integrating gyros |
| Gimbal Drives | Direct drive d-c torquers |
| Tracking Accuracy | ¼ mil for 90% of time |
| Tracking Rates (inertial) | 20 deg/sec both axes |
| Tracking Accel (inertial) | 200 deg/sec$^2$ both axes |
| Aircraft Maneuverability | |
| Angular Accelerations | 60 deg/sec$^2$ |
| Angular Rates | 60 deg/sec |
| Slew Rates | 100 deg/sec azimuth |
| | 80 deg/sec elevation |
| Static Drift Stability | 0.01 deg/sec |
| Power Consumption | |
| 28 volts dc | Average 200 watts |
| | Max 400 watts (incl heaters) |
| 26 volts ac (400~) | 30 watts (incl blowers) |

The use of torquer drives and low friction gimbal bearings results in a natural inertial stabilization of the balanced gimbals, particularly at high frequencies. At low frequency, precise stabilization is obtained through the use of rate integrating gyro sensors mounted on the inner gimbal. A high static gain is used to obtain precision in the frequency band of the airframe maneuvers.

The sight stabilization accounts, of course, only for angular motions of the airframe. The operator, using a tracking control, compensates for aircraft translatory motion. The control stick commands angular rates of the line of sight on axes which are oriented up-down and left-right with respect to the image in the eyepiece.

To enable the operator to achieve higher accuracy over longer operating periods with reduced fatigue, "aided tracking" techniques are employed. This helps to overcome the inherent operator's time delay of 0.3 to 0.5 second between display of tracking error and operator response to it.

Aided tracking consists of adding acceleration and position functions to the basic rate command from the stick, and are obtained by use of electrical networks processing the signals.

In cases of greater relative translatory velocity between aircraft and target, an additional tracking aid may be desirable. This would be a computed tracking function to a point on the ground, using aircraft velocity vector, airframe attitude, target range, sight angles and their rates and either range rate or aircraft altitude. A "stabilized tracking aid" of this nature can be readily integrated with the SOTD if desired.

Tracking is obtained by torquing the gyro through an aided tracking circuit commanded by a control stick. The tracking rates and accelerations listed in Table 2 refer to an inertial coordinate system and are therefore related to the relative translatory velocities of the airframe target.

We wish it to be understood that we do not desire to be limited to the exact details of construction shown and described, for obvious modifications will occur to a person skilled in the art.

We claim:

1. A stabilized optical tracking device for permitting an airborne observer to view and track a ground target, said device comprising the following plurality of elements constructed and arranged to provide an optical path therethrough:
   a scanning head comprising a 90° bend visual elevation prism and a 90° bend visual azimuth prism, said elevation prism being adapted to receive target light and to rotate about a horizontal axis perpendicular to the line of sight and said azimuth prism being adapted to transmit the optical path from said elevation prism and to rotate about a vertical axis perpendicular to the line of sight when pointing directly ahead,
   means for folding the optical path from the azimuth prism of said scanning head through an objective to a reticle block, said objective being adjustable to bring light rays in the optical path to a focus at said reticle block,
   a first 90° bend prism followed by a first relay lens for returning the optical path from said reticle block in a direction parallel to its folded path through a derotator prism, said derotator prism being servo driven and arranged and constructed to maintain an erect image as the scanning head rotates,
   a second 90° bend prism for directing the optical path from said derotator prism downward through a pair of windows, and
   a third 90° bend prism for directing the optical path from said windows through an eyepiece for visual viewing.

2. A device according to claim 1 including a negative objective lens removably insertable in the optical path between the azimuth prism and the folding means and a positive objective lens removably insertable in the optical path between the folding means and the objective to provide a reverse galilean telescope, said device being adapted for search and acquisition when both of said negative and positive objective lenses are inserted in said optical path.

3. A device according to claim 2 including a second relay lens removably insertable in the optical path between said pair of windows and said second 90° bend prism, said device being adapted for target tracking when both of said negative and positive objective lenses are removed from said optical path.

4. A device according to claim 3 which has a level of magnification of about 2.7 power when each of said negative and positive lenses and said second relay lens is inserted in said optical path.

5. A device according to claim 3 wherein said second relay lens has a level of magnification of about 12 power.

6. A device according to claim 3 including a third relay lens removably insertable in the optical path in place of said second relay lens between said pair of windows and said second 90° bend prism.

7. A device according to claim 6 which has a level of magnification of about 1.8 power when each of said negative and positive lenses and said third relay lens is inserted in said optical path.

8. A device according to claim 6 wherein said third relay lens has a level of magnification of about 8 power.

9. A device according to claim 1 wherein said pair of windows are so constructed and arranged that that part of the device comprising the optical path passing therethrough to the eyepiece is foldable about an axis in a plane therebetween.

10. A device according to claim 1 wherein said second 90° bend prism is interchangeable with a beamsplitter, said beamsplitter being adapted to provide two optical paths, the one being coincident with that provided by said second 90° bend prism and the other being directed to a cine camera for damage assessment.

11. A device according to claim 1 including a low light level image intensifier, means insertable into the optical path between the objective and said retical block and adapted to direct the optical path to said intensifier, and means simultaneously insertable into the optical path between said first 90° bend prism and said first relay lens and adapted to direct the intensified image into said eyepiece.

12. A device according to claim 1 wherein said scanning head includes a 90° bend laser azimuth prism, a metal baffle between said laser and visual azimuth prisms and adapted to insure separation of laser and visual optical paths and a 90° bend laser elevation prism, said laser azimuth prism being adapted to receive a laser beam and to rotate about the same axis about which said visual azimuth prism rotates and said laser elevation prism being adapted to transmit the laser beam from said laser azimuth prism along the line of sight to said target and to rotate about the same axis about which said visual elevation prism rotates, and wherein said reticle block includes precisely aligned visual and laser receiver reticles and a dichroic beamsplitter to provide eye protection from leser backscatter.

13. A device according to claim 12 including a laser transmitter for providing said laser beam and a laser receiver for receiving the target reflected laser beam from said reticle block.

14. A device according to claim 1 wherein said optical path folding means is interchangeable with a spectral beamsplitter, said spectral beamsplitter being adapted to provide two optical paths, the one being coincident with that provided by said optical path folding means and the other being directed to an infrared tracker.

* * * * *